(12) United States Patent
Yoshikawa

(10) Patent No.: US 6,389,444 B1
(45) Date of Patent: May 14, 2002

(54) ADDER APPARATUS HAVING SINGLE ADDER FOR +1 AND +2 FUNCTIONS

(75) Inventor: Atsushi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/348,482

(22) Filed: Jul. 7, 1999

(30) Foreign Application Priority Data

Jul. 10, 1998 (JP) ............................................ 10-195557

(51) Int. Cl.[7] ................................................ G06F 7/50
(52) U.S. Cl. ...................................................... 708/672
(58) Field of Search ................................ 708/672, 710, 708/711, 712, 713

(56) References Cited

U.S. PATENT DOCUMENTS

| 4,486,851 A | * | 12/1984 | Christopher et al. | ......... 708/672 |
| 5,635,858 A | * | 6/1997 | Chang et al. | ................ 708/672 |
| 5,877,972 A | * | 3/1999 | Aoki et al. | .................. 708/672 |
| 6,076,098 A | * | 6/2000 | Nguyen | ....................... 708/672 |

FOREIGN PATENT DOCUMENTS

| JP | 49-12735 | 2/1974 |
| JP | 60-181925 | 9/1985 |
| JP | 62-2877132 | 12/1987 |

OTHER PUBLICATIONS

Japanese Office Action, dated May 29, 2001, with English language translation of Japanese Examiner's comments.
T. Inoue et al., "A 300 MHz 16b BICMOS Video Signal Processor", 1993 IEEE International Solid–State Circuits Conference, Digest of Technical Papers, pp. 36–37.

* cited by examiner

*Primary Examiner*—David H. Malzahn
(74) *Attorney, Agent, or Firm*—Whitham, Curtis & Christofferson, P.C.

(57) ABSTRACT

In an adder apparatus, a first logic circuit performs a NOR operation upon a first bit of an n-bit input signal and a control signal to generate a first signal. A second logic circuit performs an OR operation upon the first bit of the n-bit input signal and the control signal to generate a logic OR signal and performs a NAND operation upon the logic OR signal and a second bit of the n-bit input signal to generate a second signal. Each of third logic circuits performs a NAND operation upon an (i–1)th (i=3, 4, . . . , n) bit of the n-bit input signal and i-th bit of the n-bit input signal to generate a third signal. A carry signal generating circuit receives the first, second and third signals to generate "n" carry signals. A sum generation circuit receives the n-bit input signal, the "n" carry signals and the control signal to generate an (n+1)-bit output signal and includes a fourth logic circuit for performing an exclusive NOR operation upon the first bit of the n-bit input signal and the control signal to generate a first bit of the (n+1)-bit output signal.

4 Claims, 7 Drawing Sheets

ADDER APPARATUS HAVING SINGLE ADDER FOR +1 AND +2 FUNCTIONS

BACKGROUND OF THE INVENTION

1. Field of the Invention

The present invention relates to an adder apparatus used in a multiplier of a processor.

2. Description of the Related Art

The above-mentioned multiplier may require an adder apparatus having a function of adding +1 to an input signal and a function of adding +2 to the input signal.

A prior art adder apparatus having the two above-mentioned adding functions adopts a binary look-ahead carry (BLC) array which is constructed by a first adder for adding +1 to an input signal, a second adder for adding +2 to the input signal, and a selector for selecting one of the first and second adders. This will be explained later in detail.

In the above-described prior art adder apparatus, however, since two kinds of adders as well as the selector are required, the circuit configuration is increased in size, which reduces the integration. Also, since a signal path includes the selector, the signal delay is increased.

SUMMARY OF THE INVENTION

It is an object of the present invention to provide a small-sized adder apparatus having a +1 function and +2 function with a small signal delay.

According to the present invention, in an adder apparatus for receiving an n-bit input signal and a control signal to generate an (n+1)-bit output signal, a first logic circuit performs a NOR operation upon a first bit of the n-bit input signal and the control signal to generate a first signal. A second logic circuit performs an OR operation upon the first bit of the n-bit input signal and the control signal to generate a logic OR signal and performs a NAND operation upon the logic OR signal and a second bit of the n-bit input signal to generate a second signal. Each of third logic circuits performs a NAND operation upon an (i−1)th (i=3, 4, . . . , n) bit of the n-bit input signal and i-th bit of the n-bit input signal to generate a third signal. A carry signal generating circuit receives the first, second and third signals to generate "n" carry signals. A sum generation circuit receives the n-bit input signal, the "n" carry signals and the control signal to generate the (n+1)-bit output signal and includes a fourth logic circuit for performing an exclusive NOR operation upon the first bit of the n-bit input signal and the control signal to generate a first bit of the (n+1)-bit output signal.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENT

Before the description of the preferred embodiment, a prior art adder apparatus will be explained with reference to FIGS. 1, 2A, 2B 3A and 3B.

Figure 1:
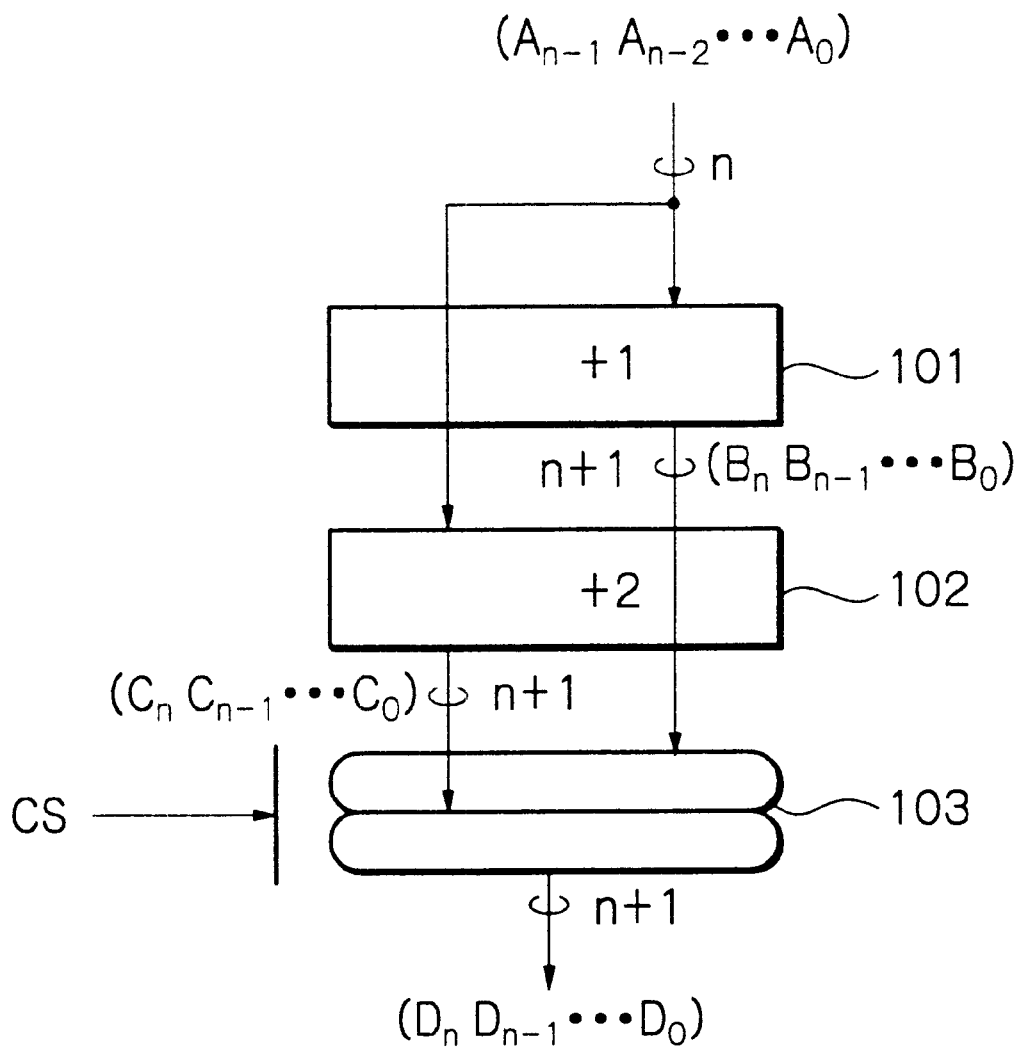
FIG. 1 is a block circuit diagram illustrating a prior art adder apparatus.

In FIG. 1, which illustrates a prior art adder apparatus, an n-bit adder 101 adds +1 to an n-bit input signal defined by $(A_{n-1} A_{n-2} \ldots A_0)$ to generate an (n+1)-bit output signal defined by $(B_n B_{n-1} \ldots B_0)$, and an n-bit adder 102 adds +2 to the n-bit input signal $(A_{n-1} A_{n-2} \ldots A_0)$ to generate an (n+1)-bit output signal defined by $(C_n C_{n-1} \ldots C_0)$. A selector 103 responds to a control signal CS to select one of the (n+1)-bit output signal $(B_n B_{n-1} \ldots B_0)$ of the n-bit adder 101 and the (n+1)-bit output signal $(C_n C_{n-1} \ldots C_0)$ of the n-bit adder 102, thus generating an (n+1)-bit output signal $(D_n D_{n-1} \ldots D_0)$.

For example, if the control signal CS="0", $$(D_n D_{n-1} \ldots D_0) = (B_n B_{n-1} \ldots B_0).$$

On the other hand, if the control signal CS="1", $$(D_n D_{n-1} \ldots D_0) = (C_n C_{n-1} \ldots C_0).$$

Figure 2A:
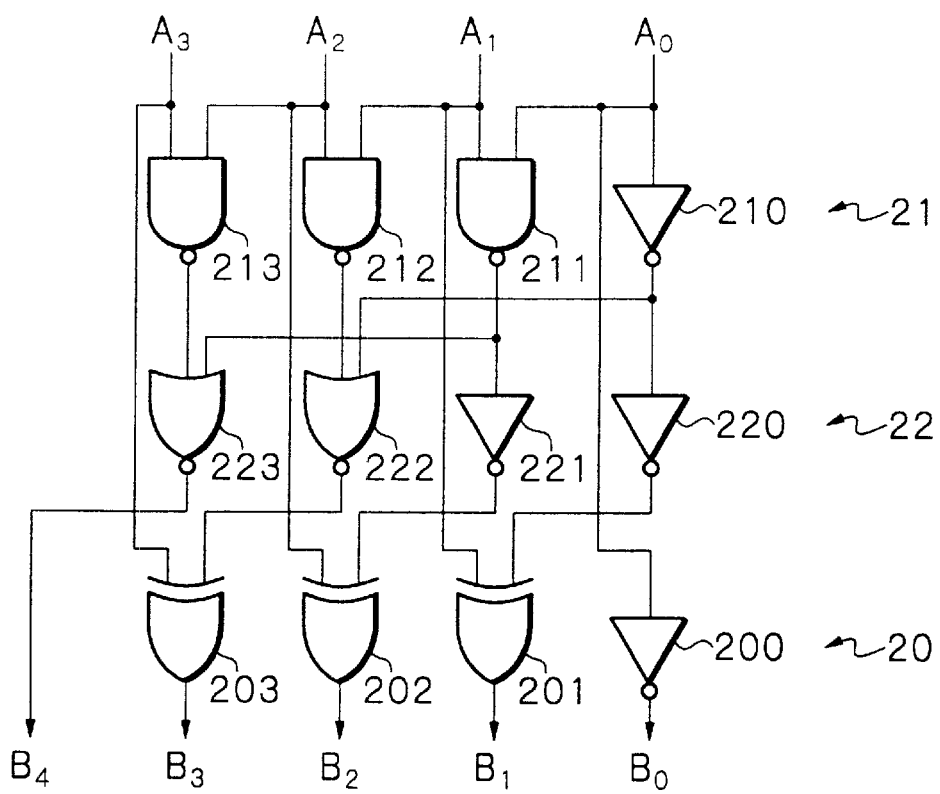
FIG. 2A is a logic circuit diagram of a first example of the +1 adder of FIG. 1.
Figure 2B:
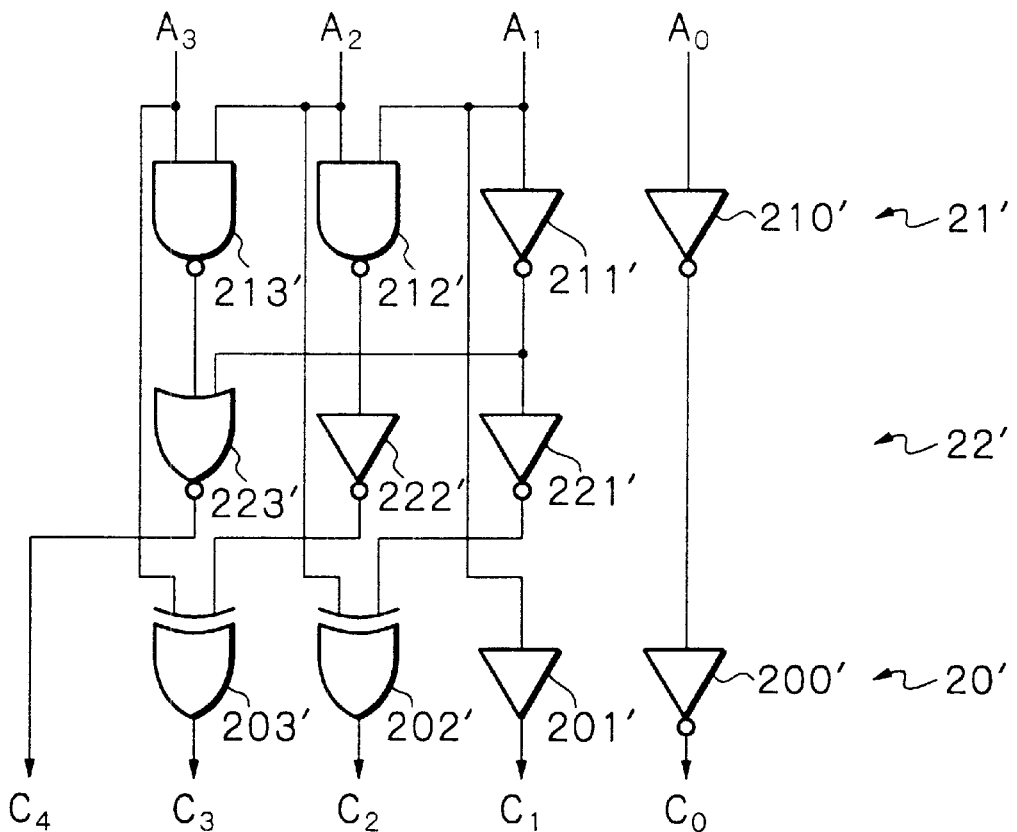
FIG. 2B is a logic circuit diagram of a first example of the +2 adder of FIG. 1.
Figure 3A:
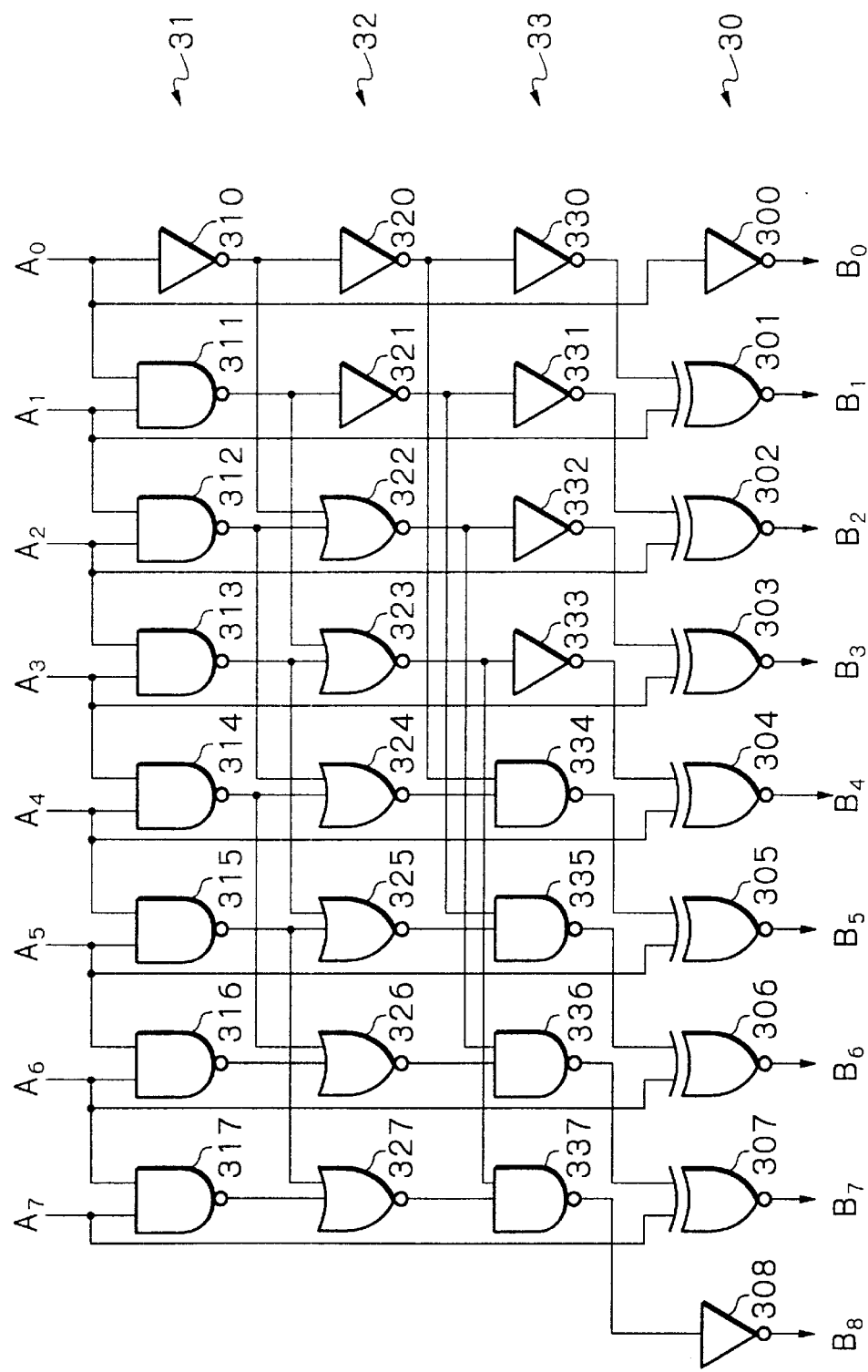
FIG. 3A is a logic circuit diagram of a second example of the +1 adder of FIG. 1.
Figure 3B:
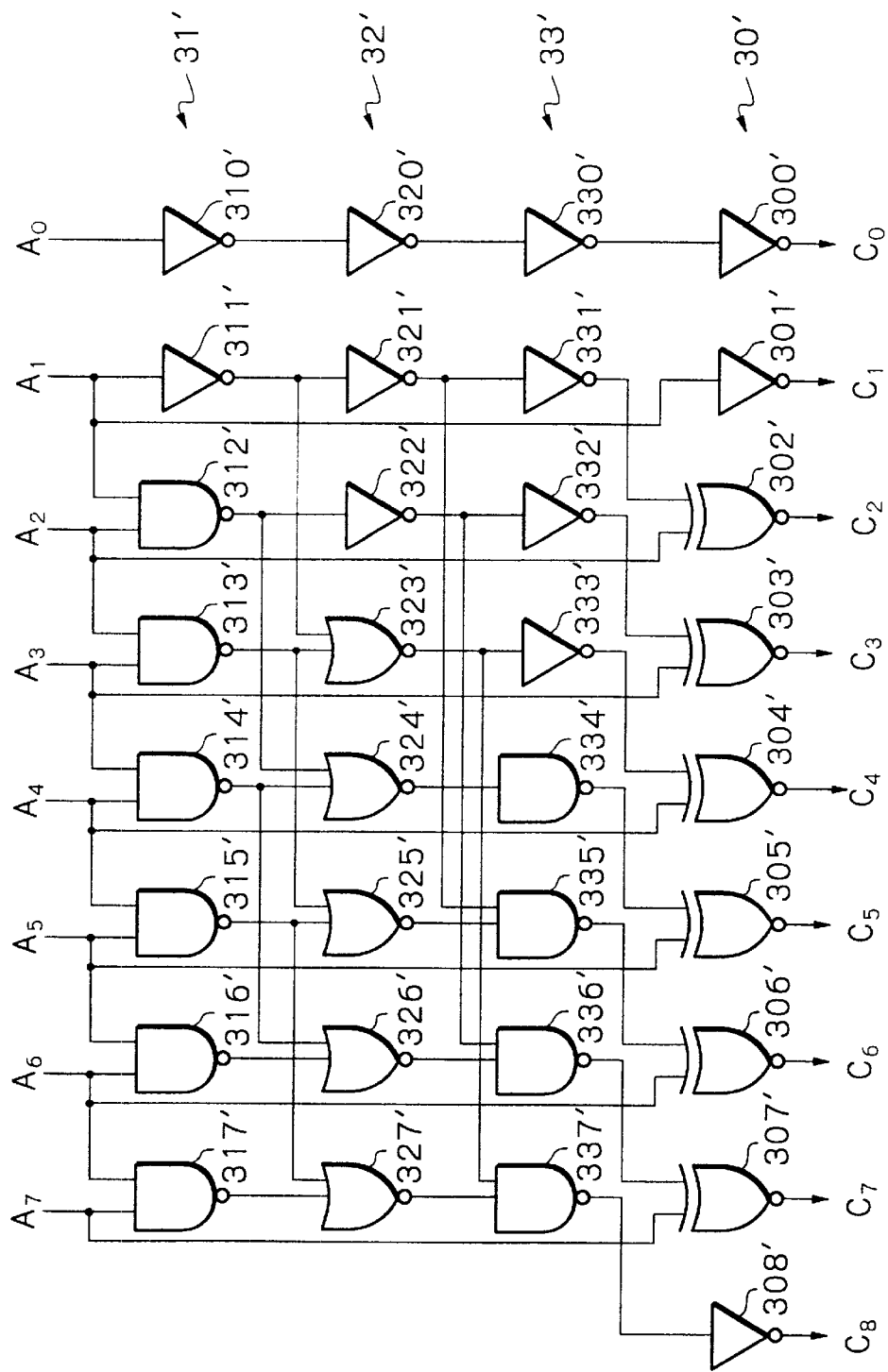
FIG. 3B is a logic circuit diagram of a second example of the +2 adder of FIG. 1.

The n-bit adders 101 and 102 can be constructed by using a binary look-ahead carry (BLC) configuration as illustrated in FIGS. 2A, 2B, 3A and 3B (see FIG. 3 of T. Inoue et al., "A 300 MHz 16b BICMOS Video Signal Processor", 1993 IEEE International Solid-Stage Circuits Conference, Digest of Technical Papers, pp.36–37).

If n=4, the 4-bit adder 101 of FIG. 1 is illustrated in FIG. 2A. That is, the 4-bit adder 101 is constructed by a first stage 21, a second stage 22 and a sum generation stage 20. In more detail, the first stage 21 is constructed by one inverter 210 and three NAND circuits 211, 212 and 213. The second stage 22 is constructed by two inverters 220 and 221 and two NOR circuits 212 and 223. The sum generation stage 20 is constructed by one inverter 200 and three exclusive OR circuits 201, 202 and 203.

Since the bit $B_0$ is the output signal of the inverter 200, $$B_0 = \overline{A_0}$$

Also, since the exclusive OR circuit 201 serves as a one-bit adder between the bit $A_1$ and the output signal of the inverter 220, $$B_1 = A_1 \oplus A_0$$

where $\oplus$ designates an exclusive OR logic.

Further, since the exclusive OR circuit 202 serves as a one-bit adder between the bit $A_2$ and the output signal of the inverter 221, i.e., the bit $A_2$ and an AND logic between the bits $A_1$ and $A_0$, $$B_2 = A_2 \oplus (A_1 \cdot A_0)$$

In addition, since the exclusive OR circuit 203 serves as a one-bit adder between the bit $A_3$ and the output signal of the NOR circuit 222, i.e., the bit $A_3$ and an AND logic among the bits $A_2$, $A_1$ and $A_0$, $$B_3 = A_3 \oplus (A_2 \cdot A_1 \cdot A_0)$$

Still further, since the bit $B_4$ is the output signal of the NOR circuit 223, i.e., an AND logic among the bits $A_3$, $A_2$, $A_1$ and $A_0$, $$B_4 = A_4 \oplus (A_3 \cdot A_2 \cdot A_1 \cdot A_0)$$

Thus, in FIG. 2A, $$(B_4 B_3 \ldots B_0) = (A_3 A_2 \ldots A_0) + (0001)$$

If n=4, the 4-bit adder 102 of FIG. 1 is illustrated in FIG. 2B. That is, the 4-bit adder 102 is constructed by a first stage 21', a second stage 22' and a sum generation stage 20'. In more detail, the first stage 21' is constructed by two inverters 210' and 211' and two NAND circuits 212' and 213'. The second stage 22' is constructed by two inverters 221' and 222' and a NOR circuit 223'. The sum generation stage 20' is constructed by two inverters 200' and 201' and two exclusive OR circuits 202' and 203'.

Since the bit $C_0$ is the output signal of the inverter 200', $$C_0 = A_0 \quad (1)$$

Since the elements 211', 212', 213', 221', 222', 223', 201', 202' and 203' of FIG. 2B correspond to the element 210, 211, 212, 220, 221, 222, 200, 201 and 202 respectively, of FIG. 2A, $$(C_4 C_3 C_2 C_1) = (A_3 A_2 A_1) + (001) \quad (2)$$

From the equations (1) and (2), $$(C_4 C_3 C_2 C_1 C_0) = (A_3 A_2 A_1 A_0) + (0010)$$

If n=8, the 8-bit adder 101 of FIG. 1 is illustrated in FIG. 3A. That is, the 8-bit adder 101 is constructed by a first stage 31, a second stage 32, a third stage 33 and a sum generation stage 30. In more detail, the first stage 31 is constructed by two inverters 310 and seven NAND circuits 311, 312, . . . and 317. The second stage 32 is constructed by two inverters 320 and 321 and six NOR circuits 322, 323, . . . , and 327. The third stage 33 is constructed by four inverters 330, 331, 332 and 333 and four NAND circuits 334, 335, 336 and 337. The sum generation stage 30 is constructed by one inverters 300 and seven exclusive OR circuits 301, 302, . . . , and 307, and an inverter 308.

Since the bit $B_0$ is the output signal of the inverter 300, $$B_0 = \overline{A_0}$$

Also, since the exclusive NOR circuit 301 serves as a one-bit adder between the bit $A_1$ and the output signal of the inverter 330, $$B_1 = A_1 \oplus A_0$$

Further, since the exclusive NOR circuit 302 serves as a one-bit adder between the bit $A_2$ and the output signal of the inverter 331, i.e., the bit $A_2$ and an AND logic between the bits $A_1$ and $A_0$, $$B_2 = A_2 \oplus (A_1 \cdot A_0)$$

In addition, since the exclusive NOR circuit 303 serves as a one-bit adder between the bit $A_3$ and the output signal of the inverter 332, i.e., the bit $A_3$ and an AND logic among the bits $A_2$, $A_1$ and $A_0$, $$B_3 = A_3 \oplus (A_2 \cdot A_1 \cdot A_0)$$

Still further, since the exclusive NOR circuit 304 serves as a one-bit adder between the bit $A_4$ and the output signal of the inverter 333, i.e., the bit $A_4$ and an AND logic among the bit $A_3$, $A_2$, $A_1$ and $A_0$, $$B_4 = A_4 \oplus (A_3 \cdot A_2 \cdot A_1 \cdot A_0)$$

Similarly, $$B_5 = A_5 \oplus (A_4 \cdot A_3 \cdot A_2 \cdot A_1 \cdot A_0)$$

$$B_6 = A_6 \oplus (A_5 \cdot A_4 \cdot A_3 \cdot A_2 \cdot A_1 \cdot A_0)$$

$$B_7 = A_7 \oplus (A_6 \cdot A_5 \cdot A_4 \cdot A_3 \cdot A_2 \cdot A_1 \cdot A_0)$$

Additionally, since the bit $B_8$ is the output signal of the inverter 308, $$B_8 = A_7 \cdot A_6 \cdot A_5 \cdot A_4 \cdot A_3 \cdot A_2 \cdot A_1 \cdot A_0$$

Thus, in FIG. 3A, $$(B_8 B_7 \ldots B_0) = (A_7 A_6 \ldots A_0) + (00000001)$$

If n=8, the 8-bit adder 102 of FIG. 1 is illustrated in FIG. 3B. That is, the 8-bit adder 102 is constructed by a first stage 31', a second stage 32', a third stage 33' and a sum generation stage 30'. In more detail, the first stage 31' is constructed by two inverters 310' and 311' and six NAND circuits 312', 313', . . . , and 317'. The second stage 32' is constructed by three inverters 320', 321' and 322' and five NOR circuits 323', 324', . . . , and 327'. The third stage 33' is constructed by four inverters 330', 331', 332' and 333' and four NAND circuits 334', 335', 336' and 337'. The sum generation stage 30' is constructed by two inverters 300' and 301' and sixth exclusive NOR circuits 302', 303', . . . , and 307', and an inverter 308'.

Since the bit $C_0$ is the output signal of the inverter 300', $$C_0 = A_0 \quad (3)$$

Since the elements 311', 312', . . . , 317', 321', 322', . . . , 327', 331', 332', . . . , 337', 301', 302' . . . , and 307' of FIG. 3B correspond to the elements 310, 311, . . . , 316, 320, 321, . . . , 326, 330, 331, . . . , 336, 300, 301, . . . , and 306, respectively, of FIG. 3A, $$(C_8 C_7 C_6 C_5 C_4 C_3 C_2 C_1) = (A_7 A_6 A_5 A_4 A_3 A_2 A_1) + (0000001) \quad (4)$$

From the equations (3) and (4), $$(C_8 C_7 C_6 C_5 C_4 C_3 C_2 C_1 C_0) = (A_7 A_6 A_5 A_4 A_3 A_2 A_1 A_0) + (00000010)$$

In the adder apparatus of FIGS. 1, 2A, 2B, 3A and 3B, however, since two kinds of adders as well as a selector for selecting one of the adders are required, the circuit configuration is increased in size, which reduces the integration. Also, since the signal path includes the selector, the signal delay is increased.

Figure 4:
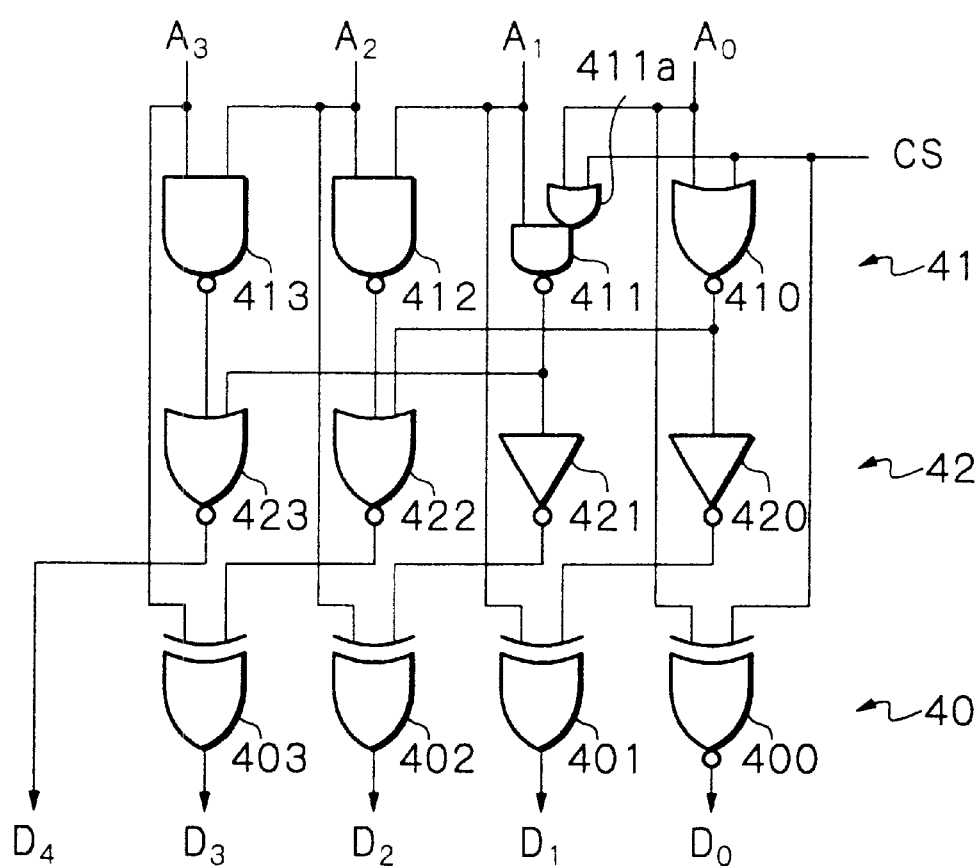
FIG. 4 is a logic circuit diagram illustrating a first embodiment of the adder apparatus according to the present invention.

In FIG. 4, which illustrates a first embodiment of the adder apparatus according to the present invention, this adder apparatus receives a 4-bit input signal defined by ($A_3$ $A_2$ $A_1$ $A_0$) to generate a 5-bit output signal defined by ($D_4$ $D_3$ $D_2$ $D_1$ $D_0$) in response to a control signal CS.

The adder apparatus of FIG. 4 is constructed by a first stage 41, a second stage 42 and a sum generation stage 40.

In more detail, the first stage 41 is constructed by a NOR circuit 410, a NAND circuit 411 associated with anOR circuit 411a, and two NAND circuit 412 and 413. Also, the second stage 42 is constructed by two inverters 420 and 421 and two NOR circuits 422 and 423. Further the sum generation stage 40 is constructed by one exclusive NOR circuit 400 and three exclusive OR circuits 401, 402 and 403.

When the control signal CS is "0", the NOR circuit 410 always serves as an inverter for receiving the bit $A_0$ to generate its inverted signal. Thus, the NOR circuit 410 corresponds to the inverter 210 of FIG. 2A. Also, since one input of the exclusive NOR circuit 400 is always receiving "0", the exclusive NOR circuit 400 always serves as an inverter for receiving the bit $A_0$ to generate its inverted signal. Thus, the exclusive NOR circuit 400 corresponds to the inverter 200 of FIG. 2A. Further, since the OR circuit 411a always receives "0", the bit $A_0$ is logically supplied directly to the NAND circuit 411. Thus, the OR circuit 411a is logically absent, so that the NAND circuit 411 associated with the OR circuit 411a corresponds to the NAND circuit 211 of FIG. 2A. Therefore, an equivalent circuit of the adder apparatus of FIG. 4 is the same as the +1 adder to FIG. 2A.

On the other hand, when the control signal CS is "1", the bit $A_0$ passes through the exclusive NOR circuit 400 without logically changing the bit $A_0$. Thus, the exclusive NOR circuit 400 always serves as a buffer, so that the exclusive NOR circuit 400 corresponds to the series of the inverters 210' and 200' of FIG. 2B. Also, since one input of the OR circuit 411a always receives "1", the output signal of the OR circuit 411a is always "1" regardless of the bit $A_0$. Thus, the NAND circuit 411 associated with the OR circuit 411a always serves as an inverter for receiving the bit $A_1$ to generate its inverted signal, and such an inverter corresponds to the inverter 211' of FIG. 2B. Further, since the output signal of the NOR circuit 410 is always "0" so that the output signal of the inverter 420 is always "1", the exclusive OR circuit 401 always serves as an inverter for receiving the bit $A_1$ to generate its inverted signal, such an inverter corresponding to the inverter 201' of FIG. 2B. Additionally, since the output signal of the inverter 420 is always "0", the NOR circuit 422 always serves as an inverter corresponding to the inverter 222' of FIG. 2B. In this case, the NOR circuit 410 and the inverter 420 are logically absent. Therefore, an equivalent circuit of the adder apparatus of FIG. 4 is the same as the +2 adder of FIG. 2B.

The adder apparatus of FIG. 4 can serve as the +1 adder of FIG. 2A and the +2 adder of FIG. 2B in response to the control signal CS without a selector configuration.

Figure 5:
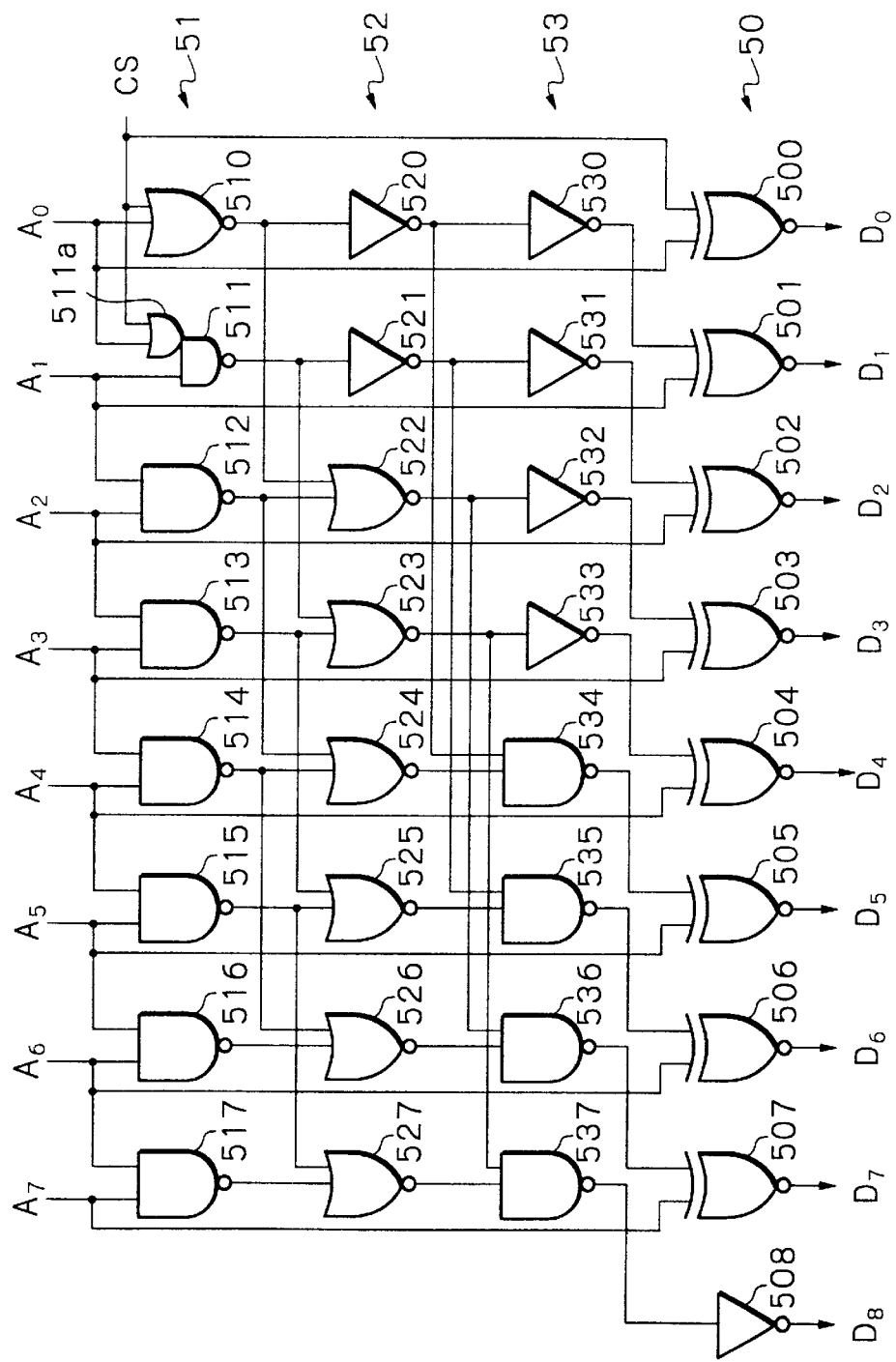
FIG. 5 is a logic circuit diagram illustrating a second embodiment of the adder apparatus according to the present invention.

In FIG. 5, which illustrates a second embodiment of the adder apparatus according to the present invention, this adder apparatus receives a 8-bit input signal defined by ($A_7$ $A_6$ $A_5$ $A_4$ $A_3$ $A_2$ $A_1$ $A_0$) to generate a 9-bit output signal defined by ($D_8$ $D_7$ $D_6$ $D_5$ $D_4$ $D_3$ $D_2$ $D_1$ $D_0$) in response to a control signal CS.

The adder apparatus of FIG. 5 is constructed by a first stage 51, a second stage 52, a third stage 53 and a sum generation stage 50. In more detail, the first stage 51 is constructed by a NOR circuit 510, a NAND circuit 511 associated with an OR circuit 511a, and six NAND circuit 512, 513, . . . , 517. Also, the second stage 52 is constructed by two inverters 520 and 521 and six NOR circuits 522 and 523, . . . , 527. Further, the third stage 53 is constructed by four inverters 530, 531, 532 and 533 and four NAND circuits 534, 535, 536 and 537. Additionally, the sum generation stage 50 is constructed by eight exclusive NOR circuits 500, 501, . . . , 507 andone inverter 508.

When the control signal CS is "0", the NOR circuit 510 always serves as an inverter for receiving the bit $A_0$ to generate its inverted signal. Thus, the NOR circuit 510 corresponds to the inverter 310 of FIG. 3A. Also, since one input of the exclusive NOR circuit 500 is always receiving "0", the exclusive NOR circuit 500 always serves as an inverter for receiving the bit $A_0$ to generate its inverted signal. Thus, the exclusive NOR circuit 500 corresponds to the inverter 300 of FIG. 3A. Further, since the OR circuit 511a always receives "0", the bit $A_0$ is logically supplied directly to the NAND circuit 511. Thus, the OR circuit 511a is logically absent, so that the NAND circuit 511 associated with the OR circuit 511a corresponds to the NAN circuit 311 of FIG. 3A. Therefore, an equivalent circuit of the adder apparatus of FIG. 5 is the same as the +1 adder to FIG. 3A.

On the other hand, when the control signal CS is "1", the bit $A_0$ passes through the exclusive NOR circuit 500 without logically changing the bit $A_0$. Thus, the exclusive NOR circuit 500 always serves as a buffer, so that the exclusive NOR circuit 500 corresponds to the series of the inverters 310', 320' 330' and 300', of FIG. 3B. Also, since one input of the OR circuit 511a always receives "1", the output signal of the OR circuit 511a is always "1" regardless of the bit $A_0$. Thus, the NAND circuit 511 associated with the OR circuit 511a always serves as an inverter for receiving the bit $A_1$ to generate its inverted signal, and such an inverter corresponds to the inverter 311' of FIG. 3B. Further, since the output signal of the NOR circuit 510 is always "0" so that the output signal of the inverters 520 and 530 are always "1" and "0", respectively, the exclusive NOR circuit 501 always serves as an inverter for receiving the bit $A_1$ to generate its inverted signal, such an inverter corresponding to the inverter 301' of FIG. 3B. Additionally, since the output signal of the NOR circuit 510 is always "0", the NOR circuit 522 always serves as an inverter corresponding to the inverter 322' of FIG. 3B. Therefore, an equivalent circuit of the adder apparatus of FIG. 5 is the same as the +2 adder of FIG. 3B.

The adder apparatus of FIG. 5 can serve as the +1 adder of FIG. 3A and the +2 adder of FIG. 3B in response to the control signal CS without a selector configuration.

In FIG. 4, the second stage 42 serves as a carry signal generating circuit. Also, in FIG. 5, the second stage 52 and the third stage 53 serve as a carry signal generating circuit.

Note that, the adder apparatuses of the above-described embodiments are of a 4-bit type and an 8-bit type; however, the present invention can be applied to adder apparatuses of an n-bit type (n=16, 32, 64, . . . ).

Further, in the above-described embodiments, each logic element can be formed by a plurality of logic elements. For example, one NOR circuit can be formed by an OR circuit and an inverter; one NAND circuit can be formed by an AND circuit and an inverter; and one exclusive NOR circuit can be formed by an exclusive OR circuit and an inverter. On the other hand, one OR circuit can be formed by a NOR circuit and an inverter; one AND circuit can be formed by an NAND circuit and an inverter; and one exclusive OR circuit can be formed by an exclusive NOR circuit and an inverter. Further, an inverter can be formed by a NAND circuit having one input fixed at "1" or a NOR circuit having one input fixed at "0".

As explained hereinabove, according to the present invention, since a +1 addicting function and +2 addicting function can be realized with a single adder configuration and without a selector, the circuit configuration can be decreased in size, thus enhancing the integration. Also, since the signal path does not include such a selector, the signal delay can be decreased.

What is claimed is:

1. An adder apparatus for receiving an n-bit input signal and a control signal to generate an (n+1)-bit output signal, comprising:

a first logic circuit for performing a NOR operation upon a first bit of said n-bit input signal and said control signal to generate a first signal;

a second logic circuit for performing an OR operation upon the first bit of said n-bit input signal and said control signal to generate a logic OR signal and performing a NAND operation upon said logic OR signal and a second bit of said n-bit input signal to generate a second signal;

a plurality of third logic circuits each for performing a NAND operation upon an (i−1)th (i=3, 4, . . . , n) bit of said n-bit input signal and i-th bit of said n-bit input signal to generate a third signal;

a carry signal generating circuit, connected to said first, second and third logic circuits, for receiving said first, second and third signals to generate "n" carry signals; and a sum generation circuit, connected to said carry signal generating circuit, for receiving said n-bit input signal, said "n" carry signals and said control signal to generate said (n+1)-bit output signal, said sum generation circuit comprising a fourth logic circuit for performing an exclusive NOR operation upon the first bit of said n-bit input signal and said control signal to generate a first bit of said (n+1)-bit output signal.

2. The apparatus as set fourth in claim 1, wherein the first bit of said n-bit input signal is a least significant bit of said n-bit input signal, the second bit of said n-bit input signal being a second least significant bit of said n-bit input signal.

3. The apparatus as set forth in claim 1, wherein, if said control signal is "0", a value of the (n+1)-bit output signal is equal to a value of the n-bit input signal plus +1, and if said control signal is "1", a value of the (n+1)-bit output signal is equal to a value of the n-bit input signal plus +2.

4. An adder apparatus for receiving an n-bit input signal and a one-bit control signal to generate an (n+1)-bit output signal, comprising:

a first NOR circuit for receiving a least significant bit of said input signal and said control signal to generate a first signal;

an OR circuit for receiving said least significant bit of said input signal and said control signal to generate an OR logic signal;

a first NAND circuit, connected to said OR circuit, for receiving a second least significant bit of said input signal and said control signal to generate a second signal;

a plurality of second NAND circuits, each receiving an (i−1)-th bit of said input signal and an i-th bit of said input signal (i=3, 4, . . . ) to generate an i-th signal;

a carry generating circuit, connected to said first NOR circuit, said first and second NAND circuits, for generating "n" carry signals; and a sum generation circuit, connected to said carry generating circuit, for receiving said input signal, said carry signals and said control signal to generate said output signal, said sum generation circuit comprising an exclusive NOR circuit for receiving the least significant bit of said input signal and said control signal to generate a least significant bit of said output signal.

* * * * *